United States Patent
Rao Karikurve

(10) Patent No.: US 12,307,498 B2
(45) Date of Patent: May 20, 2025

(54) USING MACHINE LEARNING TO PREDICT ACCEPTANCE OF LARGER SIZE VARIANTS

(71) Applicant: Maplebear Inc., San Francisco, CA (US)

(72) Inventor: Sharath Rao Karikurve, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 247 days.

(21) Appl. No.: 17/899,190

(22) Filed: Aug. 30, 2022

(65) Prior Publication Data
US 2024/0070745 A1    Feb. 29, 2024

(51) Int. Cl.
*G06Q 30/00* (2023.01)
*G06Q 30/0201* (2023.01)
*G06Q 30/0202* (2023.01)
*G06Q 30/0601* (2023.01)

(52) U.S. Cl.
CPC ..... *G06Q 30/0631* (2013.01); *G06Q 30/0201* (2013.01); *G06Q 30/0202* (2013.01); *G06Q 30/0625* (2013.01)

(58) Field of Classification Search
None
See application file for complete search history.

(56) References Cited

U.S. PATENT DOCUMENTS

| | | | |
|---|---|---|---|
| 11,232,506 B1 * | 1/2022 | Zielnicki | G06Q 30/0631 |
| 2023/0111745 A1 * | 4/2023 | Kruck | G06Q 30/0631 705/26.7 |

* cited by examiner

*Primary Examiner* — Mila Airapetian
(74) *Attorney, Agent, or Firm* — Fenwick & West LLP

(57) ABSTRACT

An online concierge system recommends a larger size variant for replacement. The system receives one or more items for an order from a user. The one or more items include a first item. The system identifies a set of candidate replacement items for the first item, and the candidate replacement items comprise one or more larger size variants. The system estimates a benefit value for each of the candidate larger size variants to replace the first item and applies a machine learned acceptance model to each candidate larger size variant to predict a likelihood that the user would accept a suggestion to replace the respective candidate larger size variant for the first item. Based on the estimated benefit value and the predicted likelihood, the system determines a larger size variant as a replacement item and sends the replacement item for display in a user interface on a user device.

20 Claims, 5 Drawing Sheets

USING MACHINE LEARNING TO PREDICT ACCEPTANCE OF LARGER SIZE VARIANTS

BACKGROUND

This disclosure relates generally recommending items in an online concierge system. More particularly, the disclosure relates to recommending a larger size variant for replacement based on a predicted acceptance.

In current online shopping concierge systems, a customer creates a shopping list of items to be purchased from a retailer. To improve customer experience and account for varying availability, an online shopping concierge system may recommend to a user various items to add to the shopping list when the user is building it. Current recommendation systems are based on previous purchase history and prior selections of replacement items by other customers when recommending the replacement items. But these systems may not account for the user's current intent, and they also may not find suggestions that help the user choose variants of an item (e.g., size) in a way that is more efficient for both the user and the online shopping concierge system.

SUMMARY

The current recommendation system does not account for the relative sizes of a product and how the size information might benefit the user. For example, if a customer is having a party and orders 10 bags of chips and 10 jars of salsa, instead of recommending particular chips and salsa that the customer previously purchased, a recommendation of a party-sized chips and salsa may better meet the customer's needs and better benefit the customer.

An online concierge system presented herein receives an order from a user through an interface, for example by an application executing on the user's client device. The order includes one or more items the user seeks to purchase via the online concierge system. Some of the items may have larger size variants that better fit the order and/or provide additional benefits to the user, such as lower price per unit, higher delivery efficiency, discount activities, etc. The online concierge system allows the user to specify a replacement item for an item in the order, authorizing a shopper fulfilling the order to obtain the replacement item if a larger size variant is available.

To aid the user in specifying a replacement item, the online concierge system receives one or more items for an order from a user. The online concierge system identifies a set of candidate replacement items for a first item in the order, where the candidate replacement items comprise one or more larger size variants. The online concierge system estimates a benefit value for each of the candidate larger size variants to replace the first item and applies a machine learned acceptance model to each candidate larger size variant to predict a likelihood that the user would accept a suggestion to replace the respective candidate larger size variant for the first item. Based on the estimated benefit value and the predicted likelihood, the online concierge system recommends to the user a larger size variant for replacing the first item.

To identify the candidate larger size variant for the first item, the online concierge system may generate a list of candidate items for the first item based on a hierarchical taxonomy and historical replacement data. The online concierge system may apply a machine learned replacement model to each of the list of candidate items to output a score that is indicative of whether a user would accept the item as a replacement for the first item, i.e., a likelihood that the candidate item would be used to replace the first item. In some cases, the online concierge system may input features that relate to the user engagement with the candidate items based on historical replacement data, such as a number of times (or percentage of times) that a candidate item has been used to replace the first item. The online concierge system then ranks the list of candidate items based on the score of each candidate item and selects the set of candidate replacement items for the first item based on the rank and sizes of the candidate items. For example, the online concierge system may only select candidate items that have larger sizes than the first item. Alternatively, the online concierge system may multiple the likelihood score and the size of each candidate item to obtain a value and select the candidate item based on the calculated value.

In an alternative embodiment, the online concierge system may include a hierarchical taxonomy with items labeled as larger size variants. The online concierge system may directly input the first item to a replacement model to output a likelihood that a user would select the labeled larger size variant as a replacement for the first item. Based on the likelihood, the online concierge system then selects a labeled larger size variant as the candidate replacement item for the first item.

Having determined the list of candidate larger size variants, the online concierge system determines whether it is worth recommending any of the candidate larger size variants, which one to recommend and how to recommend. In one aspect, the online concierge system may first calculate a benefit value for each of the candidate larger size variants. The benefit value may indicate a benefit for replacing the respective larger size variant for the first item. The benefit value for each of the candidate larger size variants may be estimated based on, e.g., value of cost saving, value of loss revenue, value of increased sale, value of time saving, value of customer experience, and sponsorship value.

In another aspect, the online concierge system applies a machine learned acceptance model to each candidate larger size variant to predict a likelihood that the user would accept a suggestion to replace the respective candidate larger size variant for the first item. The online concierge system inputs each candidate larger size variant and the first item, including customer feature information and product feature information of each, to the acceptance model. The customer feature information may include a typical size of a product in previous orders, average ordering frequency, gross merchandise value, retailers shopped in previous orders, previous response to replacement suggestions, customer's location, shopping time, items for current order. The product feature information may include size, price per unit, amount of price saving, availability, popularity, item category, and discount activity of a larger size variant.

The online concierge system then recommends to the user to replace one of the candidate larger size variants for the first item based on the predicted likelihood of acceptance and the estimated benefit value. For example, the online concierge system may calculate a recommendation value by multiplying the predicted likelihood of acceptance by the benefit value of the candidate larger size variant and comparing the recommendation value to a threshold value. If the recommendation value is larger than the threshold value, the online concierge system recommends the candidate larger size variant as a replacement item for the first item. In this way, the online concierge system utilizes the size information of the items and provides customers with accurate and useful replacement recommendations.

The online concierge system displays the selected replacement item to the user, allowing the customer to approve the replacement item as a potential replacement for the specific item. For example, the online concierge system displays the replacement item and the first item to the user via an interface displayed by an application executing on a client device of the user. The online concierge system may display the recommended larger size variant after the user adds an item to the order, which allows the user to immediately select a replacement for purchase. Alternatively, the concierge system may display recommended larger size variants for one or more products at the end of the order, which allows the user to view all recommendations at the same time and have a complete order.

The features and advantages described in the specification are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
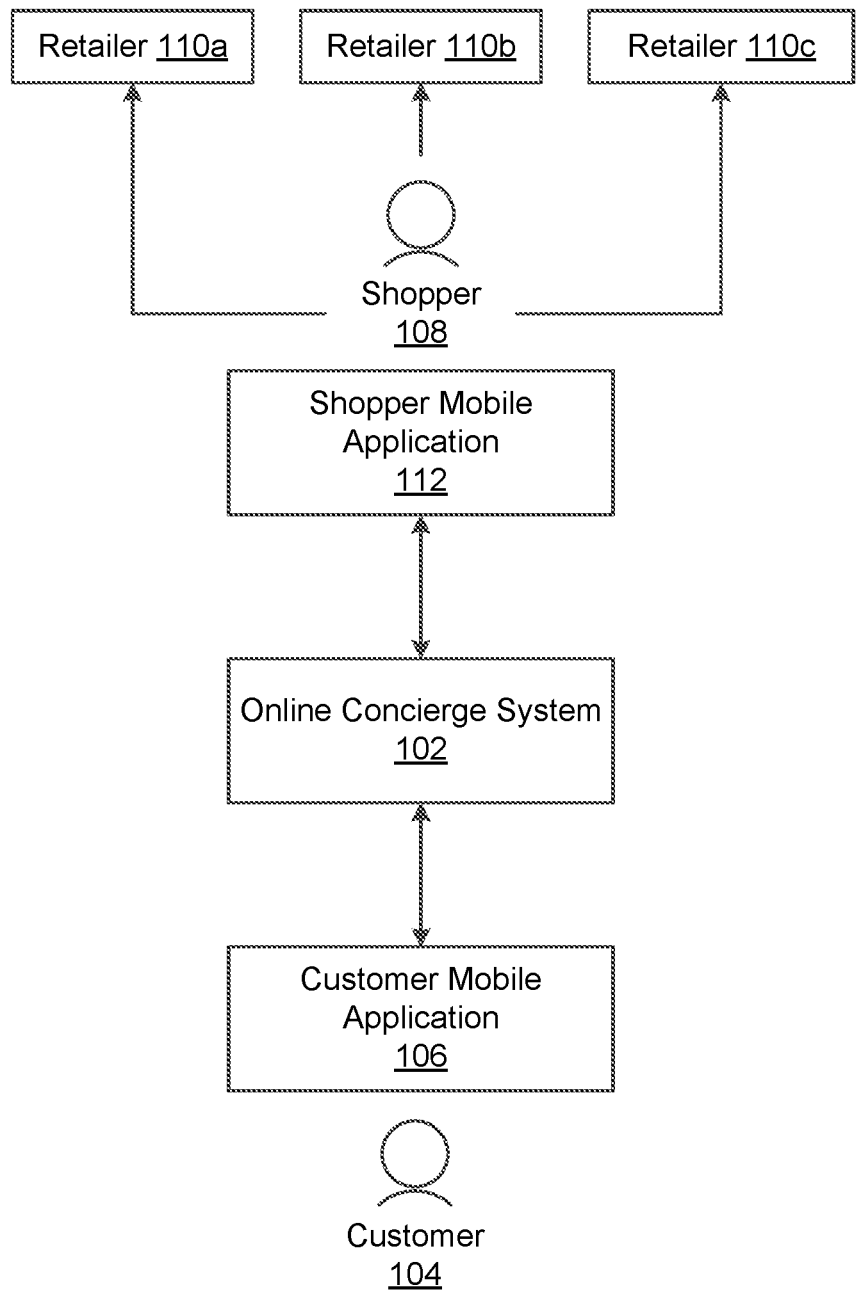
FIG. 1 illustrates the environment of an online concierge system, according to one or more embodiments.

FIG. 1 illustrates the environment 100 of an online concierge system 102, according to one or more embodiments. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures. Further, reference to using an online concierge system 102 for this invention is made throughout this specification. However, in other embodiments, another online system or mobile application may be used to determine recommended items for a shopping list.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers. Each shopper 108 fulfills an order received from the online concierge system 102 at one or more retailers 110, delivers the order to the customer 104, or performs both fulfillment and delivery. In one or more embodiments, shoppers 108 make use of a shopper mobile application 112 which is configured to interact with the online concierge system 102.

Online Concierge System

Figure 2:
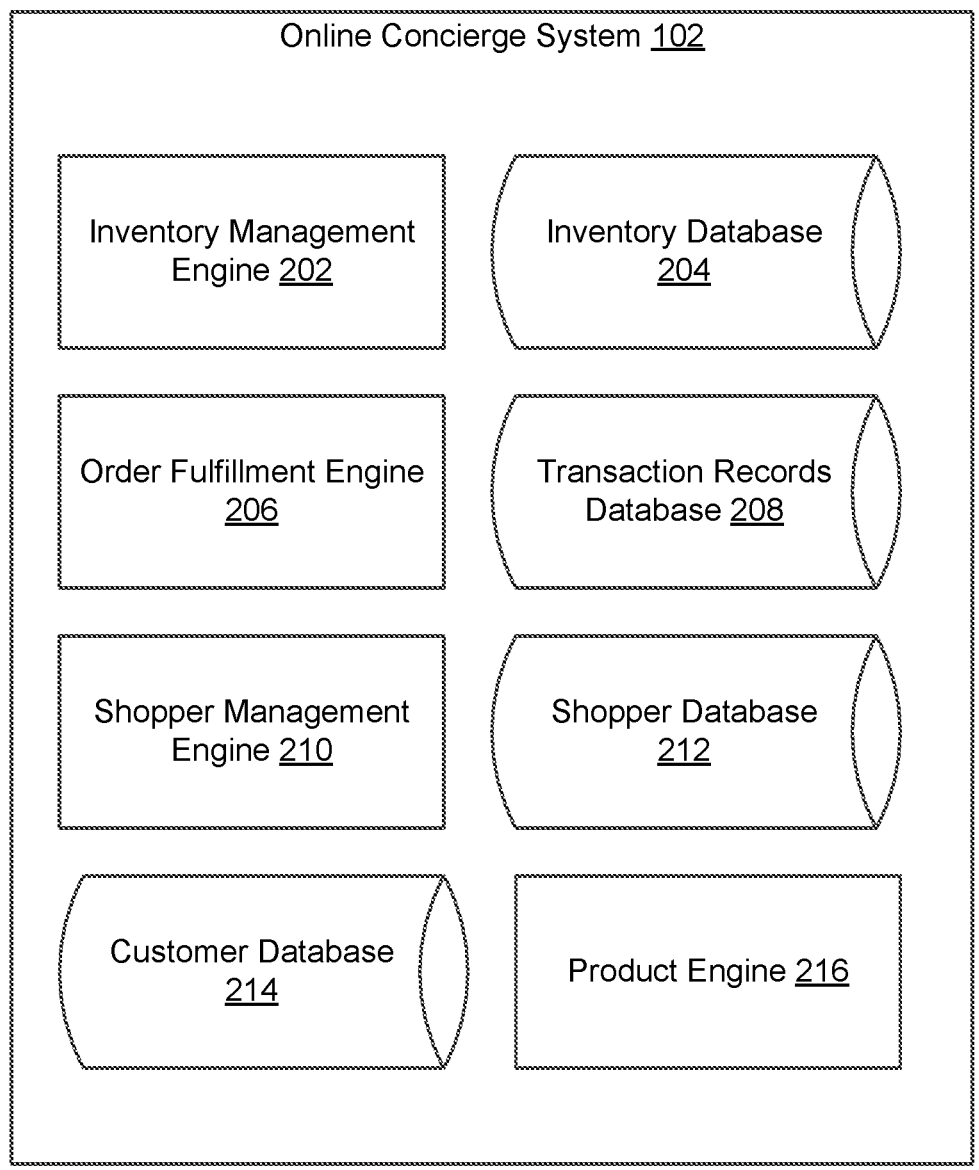
FIG. 2 is a block diagram of an online concierge system, according to one or more embodiments.

FIG. 2 is a block diagram of an online concierge system 102, according to one or more embodiments. The online concierge system 102 includes an inventory management engine 202, which interacts with inventory systems associated with each retailer 110. In one or more embodiments, the inventory management engine 202 requests and receives inventory information maintained by the retailer 110. The inventory information may include quantity of an item in stock, images of the item, price of the item, and date of restock of the item. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one or more embodiments, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at retailers). The order fulfillment engine 206 also facilitates transactions associated with each order. In one or more embodiments, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the shopper 108 and customer 104 associated with the transaction. In one or more embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one or more embodiments, the shopper management engine 210 receives a new order from the order fulfillment engine 206. The shopper management engine 210 identifies the appropriate retailer 110 to fulfill the order based on one or more parameters, such as the contents of the order, the inventory of the retailers, and the proximity to the delivery location. The shopper management engine 210 then identifies one or more appropriate shoppers 108 to fulfill the order based on one or more parameters, such as the shoppers' proximity to the appropriate retailer 110 (and/or to the customer 104), his/her familiarity level with that particular retailer 110, and so on. Additionally, the shopper management engine 210 accesses a shopper database 212 which stores information describing each shopper 108, such as his/her name, gender, rating, previous shopping history, and so on. The shopper management engine 210 transmits the list of items in the order to the shopper 108 via the shopper mobile application 112. The shopper database 212 may also store data describing the sequence in which the shoppers' picked the items in their assigned orders.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on. The online concierge system 102 also includes a product engine 216, which is further described in relation to FIG. 4.

Figure 3A:
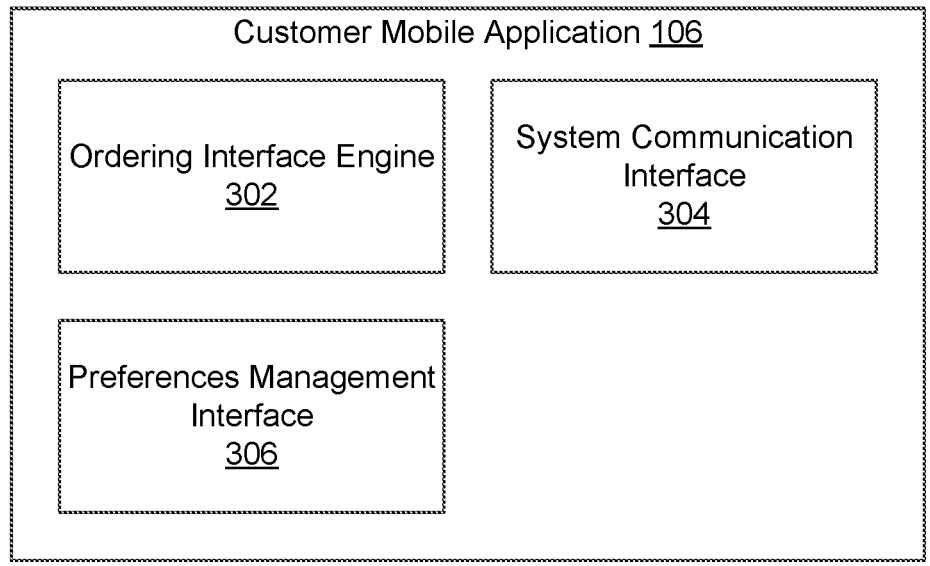
FIG. 3A is a block diagram of the customer mobile application (CMA), according to one or more embodiments.

FIG. 3A is a block diagram of the customer mobile application (CMA) 106, according to one or more embodiments. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface engine 302, which provides an interactive interface, known as a customer ordering interface, with which the customer 104 can browse through and select products and place an order.

Customers 104 may also use the customer ordering interface to message with shoppers 108 and receive notifications regarding the status of their orders. Customers 104 may view their orders and communicate with shoppers regarding an issue with an item in an order using the customer ordering interface. Customers 104 may also view and select recommended items to add to their online shopping cart via the customer ordering interface. Recommended items are items that would complement the items in a customer's online shopping cart, and the online concierge system determines recommended items by analyzing recipes with a subset of the items in the online shopping cart. For example, the order fulfillment engine 206 may determine, based on a list of items in a customer's online shopping cart, that "tomato" would complement the items given that the online shopping cart includes "basil" and "pasta." The process of determining recommended items is further described in relation to FIG. 4.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
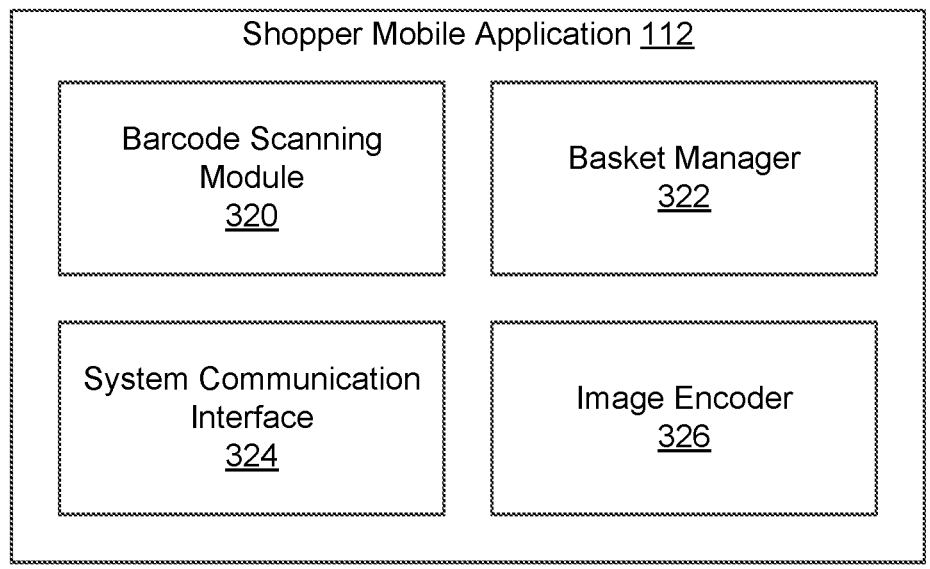
FIG. 3B is a block diagram of the shopper mobile application (SMA), according to one or more embodiments.

FIG. 3B is a block diagram of the shopper mobile application (SMA) 112, according to one or more embodiments. The shopper 108 accesses the SMA 112 via a mobile client device, such as a mobile phone or tablet. The SMA 112 may be accessed through an app running on the mobile client device or through a website accessed in a browser. The SMA 112 includes a barcode scanning module 320 which allows a shopper 108 to scan an item at a retailer 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. The SMA 112 also includes a basket manager 322 which maintains a running record of items collected by the shopper 108 for purchase at a retailer 110. This running record of items is commonly known as a "basket". In one or more embodiments, the barcode scanning module 320 transmits information describing each item (such as its cost, quantity, weight, etc.) to the basket manager 322, which updates its basket accordingly. The SMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The SMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order or communications from a customer 104. The system communication interface 324 may additionally generate a shopper order interface. The shopper order interface is an interactive interface through which shoppers may message with customers 104 and receive notifications regarding the status of orders they are assigned.

Figure 4:
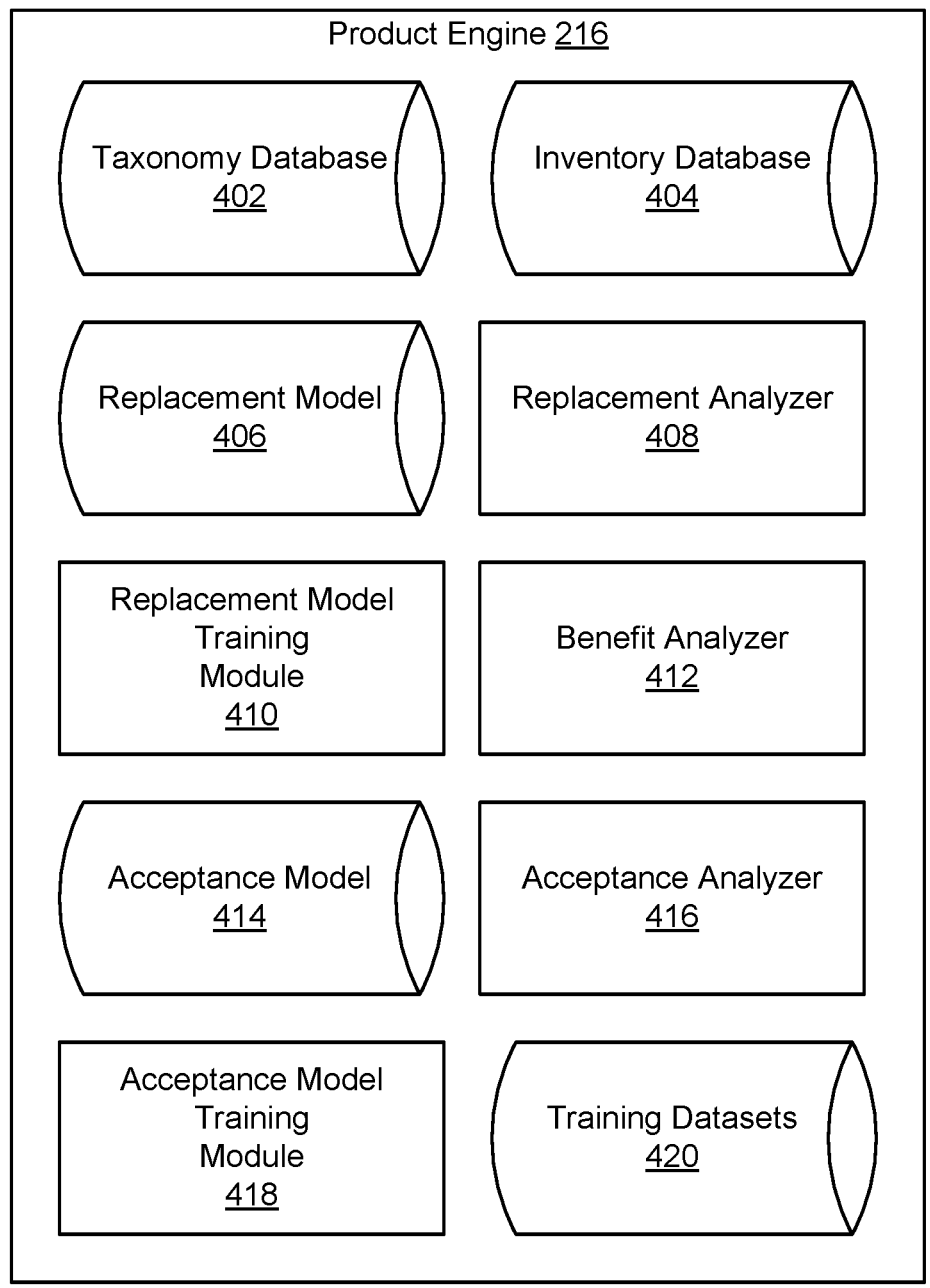
FIG. 4 is a block diagram of a product engine, according to one or more embodiments.

FIG. 4 is a block diagram of the product engine 216, according to one or more embodiments. The product engine 216 includes a taxonomy database 402, an inventory database 404, a replacement model 406, a replacement analyzer 408, a replacement model training module 410, a benefit analyzer 412, an acceptance model 414, an acceptance analyzer 416, an acceptance model training module 418, and training datasets 420. In some embodiments, the product engine 216 may include a different number or variety of modules than those shown in FIG. 4. For example, in some embodiments, the product engine 216 may include one or more alternative models that function to label a product with a category of the hierarchical taxonomy.

The replacement analyzer 408 determines candidate replacements for products. Replacements are products that can be alternatively used instead of the product and have similar characteristics to the product. For example, the product "Winston's Whole Wheat Bread" can be replaced with "Bee Honey Wheat Bread" and "Grain Harvest Organic Wheat Bread," which are similar wheat breads of different brands. In another example, a replacement for a "butter" product may be a "ghee" product or an "olive oil" product, which may be used to cook in, similar to the "butter" product. In some embodiments, replacements may include larger size variants of a product. For example, the product of "6 rolls per pack of toilet paper" may be replaced with "12 rolls per pack of toilet paper" or "24 rolls per pack of toilet paper." These characteristics of products may be stored in the inventory database 404, as described below.

The replacement analyzer 408 accesses a taxonomy database 402, which stores a hierarchical taxonomy of products sold by retailers 110 associated with the online concierge system 102. The hierarchical taxonomy is a taxonomy of ranked categories of products sold at one or more retailers 110. Each category may include a plurality of other subcategories (also referred to as "categories" for simplicity) and a plurality of products labeled with the category. For example, the product "Butterfly Organic Butter" may be labeled with the categories "Dairy" and "Butter," where "Butter" is a category of "Dairy." The hierarchical taxonomy may be generated by a machine-learning model trained to determine a hierarchy of products based on retailer 110 information, an inventory of products, historical orders placed by customer 104, and/or historical search queries entered by customers 104 via the CMA 106. The hierarchical taxonomy may include size information of products. For example, toilet paper may be sold at 6 rolls per pack, 12 rolls per pack, 24 rolls per pack, etc. Dish soap may be sold at 16 Fl oz per bottle, 24 Fl oz per bottle, 56 Fl oz per bottle. In some embodiments, the size information of each product may be normalized. Similar products having larger sizes may be ranked higher in the hierarchical taxonomy. In some cases, portions of the hierarchical taxonomy may be manually labeled by a moderator. For example, larger size variants in the hierarchical taxonomy can be manually labeled by a moderator.

The replacement analyzer 408 may identify an item (e.g., a product) for an order from a customer 104 and determine a set of candidate replacement products for the product. In some embodiments, a replacement condition may be established to determine whether to identify an item for replacement. For example, the replacement condition may be that the item is out of stock, or a larger size variant for the item is available, etc. When the replacement condition for an item in the order is met, the replacement analyzer 408 may be triggered to identify a set of candidate replacement products for the item. The set of candidate replacement products may include one or more larger size variants for the product. To predict a replacement for a product, the replacement analyzer 408 applies a replacement model 406. The online concierge system 102 may use the replacement model 406 to determine a set of candidate replacement products for a product. The online concierge system 102 may also use the replacement model 406 to label a product based on the hierarchical taxonomy (e.g., labeling the product based on how replacements for the product are labeled). The replacement model 406 is configured to predict a likelihood that a product is a replacement for an input product. The replacement model 406 may be a machine learning model, such as a deep neural network, a regression model, a classifier, or any other suitable type of machine learning model. In some embodiments, the replacement model 406 is a query system that queries a graph database of historical data describing replacements for products. The historical data may describe search queries entered by customers 104 via the CMA 106 and products viewed and/or ordered as a result of each search query.

To predict the likelihoods, the replacement model 406 retrieves characteristics of the input product from the inventory database 404. Characteristics may include types of the product (e.g., different flavors, age, etc.), sizes of the product sold at retailers 110, attributes of the product (i.e., cheese crackers are "snack food" and "cheesy" or the input product is "kosher," "vegan," etc.), and the like. In some embodiments, the characteristics of the input product may include name, location at a retailer 110 (e.g., aisle number and/or department), brand, and price. The replacement analyzer 408 selects a list of candidate products for the input product. In some embodiments, the replacement analyzer 408 selects candidate products with a threshold number of the same characteristics as the input product. In some embodiments, the list of candidate products are all products in the inventory database 404 or the taxonomy database 402. In some embodiments, the list of candidate products may be selected from the taxonomy database 402 and based on historical replacement data. For each candidate product in the list, the replacement analyzer 408 inputs the candidate product and the input product, including characteristics of each, to the replacement model 406. Further, in some instances, the replacement analyzer may input features that relate to the user engagement with the products based on historical replacement data, such as a number of times (or percentage of times) that a candidate product has been used to replace the input product on the online concierge system 102. The replacement model 406 outputs a score that is indicative of whether a customer 104 would accept the candidate product as a replacement for the input product, i.e., a likelihood that the candidate product would be used to replace the input product. For example, the product "Moo Moo Organic 2% Milk" may have a 70% likelihood of being replaced by "Moo Moo 2% Milk" and a 15% likelihood of being replaced by "Moo Moo Organic Whole Milk." The replacement model 406 is trained by the replacement model training module 410, which is further described below.

The replacement analyzer 408 receives a likelihood for each of the list of candidate products from the replacement model 406. The replacement analyzer 408 may rank the list of candidate products based on the score of each candidate product, and select a set of candidate replacement products based on the rank and the sizes of the candidate products. In some embodiments, the replacement analyzer 408 may select a candidate replacement product from the list with the highest likelihood (i.e., score) for replacing the input product. Alternatively, the replacement analyzer 408 may determine a set of candidate replacement products with a likelihood above a threshold value (e.g., 85%) and add those to the set. In some embodiments, the replacement analyzer 408 may only select candidate replacement products having sizes that are larger than the size of the input product. In some embodiments, the replacement analyzer 408 may multiply the likelihood score and the size to obtain a comprehensive value, and select candidate replacement products based on the comprehensive value of each candidate product.

In an alternative embodiment, the hierarchical taxonomy may label one or more larger size variants for a category of products and/or characteristic of products. The replacement analyzer 408 may select a list of candidate products from the labeled larger size variants for the input product. For each candidate product in the list, the replacement analyzer 408 inputs the candidate product and the input product to the replacement model 406, which outputs, for each candidate larger size variant, a likelihood that a user would select the candidate larger size variant as a replacement for an input product. In some embodiments, the replacement analyzer 408 may select a candidate replacement product from the larger size variants with the highest likelihood for replacing the input product. Alternatively, the replacement analyzer 408 may determine one or more larger size variants as a set of candidate replacement products with a likelihood above a threshold value.

The replacement model 406 may be trained by a replacement model training module 410 using training data describing replacements made by customers 104. For instance, a customer 104 may have an opportunity to replace a first product with a second product when the first product is unavailable. This may occur in a plurality of scenarios as the customer 104 engages with the CMA 106, such as when the customer 104 enters a search query for the first product, receives a suggestion of the second product when viewing information about the first product, and the like. Whether or not the customer 104 replaces the first product with the second product may be stored as historical data by the CMA 106, which the replacement model training module 410 may use as training data to train the replacement model 406. For example, if a customer 104 entered the search query "organic milk" and ended up ordering "Smooth Sailing Vanilla Almond Milk" shortly after viewing "Sweet Farms Vanilla Almond Milk," the training data would include the set of "Smooth Sailing Vanilla Almond Milk" and "Sweet Farms Vanilla Almond Milk" labeled with a "1." Further, if the customer 104 also viewed "Store Brand Almond Milk" after viewing "Sweet Farms Vanilla Almond Milk," but did not order "Store Brand Almond Milk," the training data would include the set of "Store Brand Almond Milk" and "Sweet Farms Vanilla Almond Milk" labeled with a "0." Each set may also include the characteristics of each product. The training data comprises a plurality of labeled sets of products viewed by a plurality of customers in the scenarios. The replacement model training module 410 trains the replacement model 406 on the labeled sets of products to predict a computed likelihood that a second product is a replacement for a second product.

In some embodiments, the training data may also include historical data representing feedback from customers 104 about products used as replacements. For instance, a customer 104 may provide feedback on a replacement made for a product in an order. In one example, a shopper 108 may replace a product upon determining that the product is unavailable at a retailer 110 when shopping. The CMA 106 may send a notification of the replacement to the customer 104 to approve or deny. Further, upon receiving the order, the customer may enter feedback via the CMA 106 about the replacement for the product (e.g., whether the customer 104 liked the replacement or not or a rating of the replacement). In another instance, the customer 104 may select a replacement for a product before placing the order (e.g., upon checking out, the CMA 106 may indicate that a product is unavailable and needs to be replaced). These occurrences of products being replaced may be stored as historical data by the CMA 106.

The benefit analyzer 412 estimates a benefit value for a larger size variant. The benefit value indicates a benefit for replacing the larger size variant for the input product. The benefit value may be associated with expected values for replacing the larger size variant for the input product. The benefit value may be estimated based on one or more factors: value of cost saving, value of loss revenue, value of increased sale, value of time saving, value of customer experience, and sponsorship value. For example, replacing a larger size variant for a product may reduce the number of shopping times, thus, reducing the shopper's effort and human labor. It can increase the sale quantity and thus increase the revenue from the current order, although it may result in loss of revenue from future orders. It also may reduce the shopping time for the customers, shoppers and the retailers, bringing time saving benefits for multiple parties. Additionally, larger size variant replacement recommendations may improve customer experience due to customer's cost saving benefits. Further, brands may bid for the recommendation of replacement which can bring an expected benefit value of the sponsorship. The benefit analyzer 412 may calculate the benefit value using a predetermined formula. By inputting the one or more factors into the formula, a benefit value for a larger size variant as a replacement can be calculated. Alternatively, the benefit analyzer 412 may use a machined learning model to determine the benefit value. The machine learning model may be, for example, a deep neural network, a regression model, a classifier, or any other suitable type of machine learning model. Based on the calculated benefit value, the product engine 216 may decide whether to recommend the corresponding larger size variant for replacing a product for an order.

The product engine 216 further includes an acceptance model 414, an acceptance analyzer 416, an acceptance model training module 418, and training datasets 420. The acceptance model training module 418 uses the training datasets 420 to generate the acceptance model 414. The acceptance model 414 can learn from the training datasets 420, rather than follow only explicitly programmed instructions. The acceptance analyzer 416 can use the acceptance model 414 to predict a likelihood that a customer would accept a suggestion to replace a larger size variant for an input product.

The acceptance analyzer 416 is configured to apply the acceptance model 414 to each candidate larger size variant to predict a likelihood that the customer would accept a suggestion to replace the candidate larger size variant for the input product in the order. For each of the set of candidate larger size variants that is determined by the replacement analyzer 408, the acceptance analyzer 416 inputs the candidate larger size variant and the input product, including customer feature information and product feature information of each, to the acceptance model 414. The customer feature information may include: typical size of a product in previous orders, average ordering frequency, gross merchandise value, retailers shopped in previous orders, previous response to replacement suggestions, customer's location, shopping time, items for current order. The product feature information may include: size, price per unit, amount of price saving, availability, popularity, item category, and discount activity of a larger size variant. The acceptance model 414 may be adapted to receive any information that the acceptance model training module 418 identifies as indicators that a customer would accept a suggestion to replace a larger size variant for an input product.

The acceptance model 414 contains a set of functions generated by the acceptance model training module 418 from the training datasets 420 that relate the larger size variant, warehouse, previous purchase information, customer, and/or any other relevant inputs, to the probability that the customer will replace the larger size variant for the input product. Thus, for a given candidate larger size variant, the acceptance model 414 outputs a probability that the candidate larger size variant will be purchased by a customer when recommended to the customer as a replacement for a product in an order. The set of functions of the acceptance model 414 may be updated and adapted following retraining with new training datasets 420. The acceptance model 414 may be any machine learning model, such as a neural network, boosted tree, gradient boosted tree or random forest model.

The training datasets 420 relate a variety of different factors to known replacement information from the outcomes of previous delivery orders (e.g. if a large size variant was previously purchased or not purchased after presenting a replacement recommendation). The training datasets 420 include the larger size variants included in previous delivery orders, the input products in the previous delivery orders, customer information associated with the previous delivery orders, and product feature information associated with each of the larger size variants (which may be obtained from the inventory database 204). Each piece of data in the training datasets 420 includes the outcome of a previous delivery order (e.g., if the larger size variant was purchased or not). In addition to previous delivery orders, the training datasets 420 is supplemented by customer feature information provided by the customer database 214. The product feature information and the customer feature information may be determined by the acceptance model 414 to be statistically significant factors predictive of customer's acceptance of the replacement recommendation on a larger size variant. For example, it would be more likely for a customer to replace a larger size variant for olive oil than replacing a larger size variant for fresh beans. It would be more likely for a customer who often shops from big box retailers than another customer who often shops from local grocery stores to accept the larger size variant replacement recommendation. For each product, the acceptance model 414 may weigh these factors differently, where the weights are a result of a "learning" or training process on the training datasets 420. The training datasets 420 are very large datasets taken across a wide cross section of warehouses, customers, products, delivery orders, times, and larger size variants.

The training datasets 420 include product feature information of a larger size variant. The product feature information may include size, price per unit, amount of price saving, availability, popularity, item category, and discount activity of the candidate larger size variant. For example, a product for an order may be a "single bottle, 19.4 Fl Oz, Orange dish soap" (i.e., an input product) in an order, the price of this input product is $4.29 and the price per unit is $0.22/Fl Oz. A large size variant of this input product may be a "pack of 2, 56 Fl Oz per bottle, Orange dish soap." The training datasets 420 also include the price of the larger size variant, e.g., $15.48 and its price per unit, $0.14/Fl Oz. In some examples, the product feature information includes item categories associated with the larger size variant. For example, if the larger size variant is a banana, it is associated with the produce category. If the larger size variant is a dish soap, it is associated with the household product category. The item category may be the produce, nonfood and pharmacy, household product, personal care, or any other categorization of items used by the warehouse. The item category may affect the likelihood of acceptance, since certain item categories may have a higher acceptance rate for larger size variants than others. The product feature information may include an item popularity score. The item popularity score for a larger size variant may be proportional to the number of delivery orders received that include the larger size variant. The item popularity score for a larger size variant may be proportional to the number of replacements accepted for the larger size variant. The product feature information may include availability of a larger size variant. If a product is often out of stock, a customer would be more likely to purchase a larger size variant when it is available. In some examples, the item attributes may include discount activities associated with the larger size variant. If a customer can obtain a discount for purchasing a larger size variant, the customer is more likely to accept a recommendation to replace the larger size variant for the input product.

The training datasets 420 include customer feature information. The training datasets 420 may obtain customer feature information provided from the customer database 214. The customer feature information may include typical size of a product in previous orders, average ordering frequency, gross merchandise value, retailers shopped in previous orders, previous response to replacement suggestions, user location, shopping time, items for current order. For example, whether a customer often purchases larger size products, whether the customer often shops from big box retailers, whether a customer shops every day or every week, whether the customer accepted or rejected previous larger size variant recommendations, etc., the customer feature information is used to train the acceptance model 414 for predicting a likelihood that the customer would accept a suggestion to replace a larger size variant for the input product. In some embodiments, the training datasets 420 include a frequency of rejection for a customer, for example, the number of times that the customer has rejected a larger size variant replacement recommendation, the number of rejections in a predetermined period of time, the time intervals between the rejections, etc.

The relationships among customer feature information, product feature information and the likelihood of acceptance are determined by the acceptance model training module 418 training a machine learning model with the training datasets 420, producing the acceptance model 414. The training datasets 420 may include additional data that affects the likelihood of acceptance and can therefore be used to build the acceptance model 414. The training datasets 420 may be periodically updated with recent previous replacement information. Following updating of the training datasets 420, the acceptance model training module 418 may retrain a model with the updated training datasets 420 and produce a new acceptance model 414.

The training datasets 420 may further include information describing how to display a replacement product in an order. For example, one way to display a larger size variant for replacing a product in an order may be more likely to lead to an acceptance of replacement recommendation than another way to display the larger size variant. In some embodiments, an acceptance may be more likely if the online concierge system 102 displays the recommended larger size variant, in an ordering interface, after a customer adds a product to the order, which allows the customer to immediately select a replacement for purchase. Alternatively, an acceptance may be more likely if the concierge system 102 displays, in an ordering interface, recommended larger size variants for one or more products at the end of the order, which allows the customer to view all recommendations at the same time and have a complete order. Similarly, the price saving amount for each larger size variant and the total saving amount may affect the acceptance, and thus can be displayed to the customer with the recommendations.

The acceptance analyzer 416 receives a likelihood for each of the set of candidate larger size variants from the acceptance model 414. The acceptance analyzer 416 may select one or more larger size replacements based on the likelihood of each candidate larger size variant and the benefit value of the candidate larger size variant. The benefit value is determined by the benefit analyzer 412. In some embodiments, the acceptance analyzer 416 may calculate a recommendation value based on the likelihood and the benefit value. For example, the recommendation value may be calculated by multiplying the likelihood by the benefit value of a candidate larger size variant. Based on the calculated recommendation value, the acceptance analyzer 416 may further determine one or more candidate larger size variants as the replacements. In some embodiments, the acceptance analyzer 416 may select a replacement from the list with the highest recommendation value for replacing the input product. Alternatively, the acceptance analyzer 416 may determine one or more replacements with a recommendation value above a threshold value. In some embodiments, the acceptance analyzer 416 may determine whether to recommend a replacement based on a frequency of rejection on larger size variant replacement recommendations for a customer. The acceptance analyzer 416 may set a threshold value. When a customer's frequency or rejection is larger than the threshold value, the acceptance analyzer 416 may determine not to recommend to the customer to replace a larger size variant for a product in the order.

The online concierge system displays the selected replacement item to the customer, allowing the customer to approve the replacement item as a potential replacement for the specific item. For example, the online concierge system displays the replacement product and the input product to the customer via an interface displayed by an application executing on a client device of the consumer. In some embodiment, the online concierge system 102 displays the recommended larger size variant after a customer adds a product to the order. Alternatively, the concierge system 102 displays recommended larger size variants for one or more products at the end of the order. In response to receiving an authorization from the customer to replace the specific product with the selected replacement product, the online concierge system 102 may update the user interface, e.g., a shopping cart, to add the replacement item in the order. The online concierge system 102 may store user's acceptance information in the training datasets 420 for training the acceptance model 414. For example, the online concierge system 102 may receive feedback information indicating whether the user replaces the replacement item for a product the order and use the feedback information to re-train and update acceptance model 414.

Figure 5:
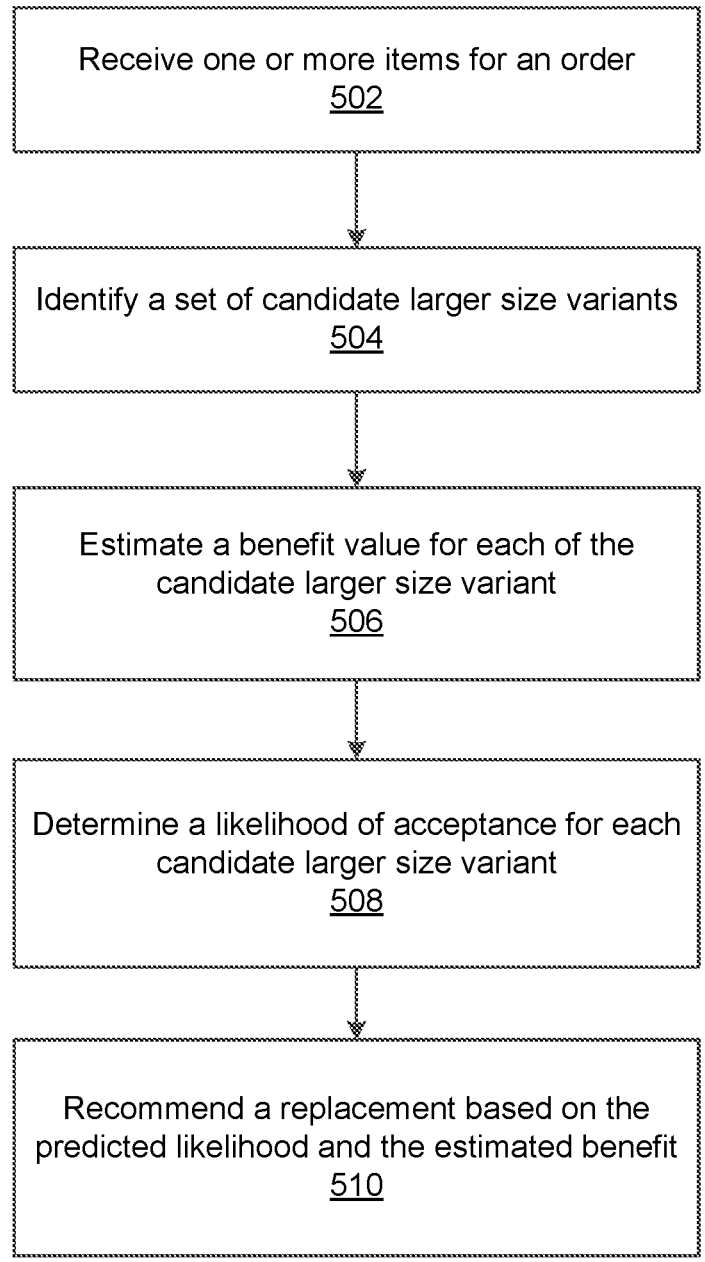
FIG. 5 is a flowchart illustrating a process for recommending larger size variants for replacement, according to one or more embodiments.

FIG. 5 is a flowchart illustrating a process 500 for recommending larger size variants for replacement, according to one or more embodiments. Though reference is made to the online concierge system 102 for this process 500, the process 500 can be used by other online systems or mobile applications for recommending a larger size variant for replacement. The online concierge system 102 receives 502 one or more items for an order from a user. The user may be a customer 104 or a shopper 108. The one or more items may include a first item (e.g., a product).

The replacement analyzer 408 may identify 504 a set of candidate replacement items for the first item. The set of candidate replacement items may include one or more larger size variants for replacing the first item. In some embodiments, the replacement analyzer 408 may generate a list of candidate items for the first item based on a hierarchical taxonomy 402 and historical replacement data. The replacement analyzer 408 may apply a machine learned replacement model 406 to each of the list of candidate items to output a score that is indicative of whether a user would accept the items as a replacement for the first item. The replacement analyzer 408 ranks the list of candidate items based on the score of each candidate item and selects the set of candidate replacement items for the first item based on the rank and sizes of the candidate items. Alternatively, the replacement analyzer 408 may access a hierarchical taxonomy 402 in the online concierge system 102. The hierarchical taxonomy 402 comprises items labeled as larger size variants. The replacement analyzer 408 then inputs the first item to the replacement model 406 to output a likelihood that a user would select the labeled larger size variant as a replacement for an input item. Based on the likelihood, the replacement analyzer 408 then selects a labeled larger size variant as the candidate replacement item for the first item.

The benefit analyzer 412 may estimate 506 a benefit value for each of the candidate larger size variants to indicate a benefit for replacing the respective larger size variant for the first item. The benefit value for each of the candidate larger size variants may be estimated based on, e.g., value of cost saving, value of loss revenue, value of increased sale, value of time saving, value of customer experience, and sponsorship value.

The acceptance analyzer 416 applies 508 a machine learned acceptance model 414 to each candidate larger size variant to predict a likelihood that the user would accept a suggestion to replace the respective candidate larger size variant for the first item. The acceptance analyzer 416 recommends 510 to the user to replace one of the candidate larger size variants for the first item based on the predicted likelihood and the estimated benefit value. For example, the acceptance analyzer 416 may calculate a recommendation value by multiplying the predicted likelihood of a candidate larger size variant by the benefit value of the candidate larger size variant and compare the recommendation value to a threshold value. If the recommendation value is larger than the threshold value, the acceptance analyzer 416 recommends the candidate larger size variant as a replacement item for the first item.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising, at a computer system comprising at least one processor and memory:
   receiving, at the computer system, one or more items for an order from a user;
   identifying a set of candidate replacement items for a first item of the one or more items, wherein the candidate replacement items comprise one or more larger size variants for the first item;
   estimating a benefit value for each of the candidate larger size variants when replacing the respective larger size variant for the first item;
   applying a machine learned acceptance model to each candidate larger size variant to predict a likelihood that the user would accept a suggestion to replace the respective candidate larger size variant for the first item, wherein the machine learned acceptance model is trained by:
      accessing a training dataset comprising a plurality of training examples, each training example including a target item, a larger size variant for the target item, and a label indicating whether the larger size variant was previously purchased or not as a replacement for the target item,
      applying the acceptance model to each training example to determine a difference between the label and the predicted likelihood of the user accepts to replace the target item with the larger size variant in the respective training example,
      updating the training dataset by updating the label of the respective training example based on the determined difference and by supplementing the training examples with user feature information and product feature information, and
      updating the acceptance model for each training example using the updated training dataset;
   determining one of the candidate larger size variants as a replacement item for the first item based on the predicted likelihood and the estimated benefit value; and
   sending the replacement item for display in a user interface on a user device.

2. The method of claim 1, wherein
   the user feature information comprises one or more of: typical size of a product in previous orders, average ordering frequency, gross merchandise value, retailers shopped in previous orders, previous response to replacement suggestions, user location, shopping time, items for current order; and
   the product feature information comprises one or more of: size, price per unit, amount of price saving, availability, popularity, item category, and discount activity of the candidate larger size variant.

3. The method of claim 2, further comprising:
training, using the user feature information and the product feature information of an item, the machine learned acceptance model to predict a likelihood that the user would accept a suggestion to replace a candidate larger size variant for the item.

4. The method of claim 3, further comprising:
receiving feedback information indicating whether the user replaces the replacement item for the first item; and
updating the machine learned acceptance model using the feedback information.

5. The method of claim 1, wherein the benefit value for each of the candidate larger size variants is estimated based on one or more of: value of cost saving, value of loss revenue, value of increased sale, value of time saving, value of customer experience, and sponsorship value.

6. The method of claim 1, wherein determining one of the candidate larger size variants as a replacement item for the first item based on the predicted likelihood and the estimated benefit value comprises:
calculating a recommendation value by multiplying the predicted likelihood of a candidate larger size variant by the benefit value of the candidate larger size variant; and
responsive to the recommendation value being larger than a threshold value, recommend the candidate larger size variant as the replacement item for the first item.

7. The method of claim 1, wherein sending the replacement item for display in a user interface on a user device comprises:
responsive to the first item being added to the order, presenting, in the user interface, the replacement item with a price saving amount associated with the replacement item.

8. The method of claim 7, further comprising:
receiving an input from the user indicating that the user accepts the replacement item; and
updating the user interface to add the replacement item in the order.

9. The method of claim 1, wherein sending the replacement item for display in a user interface on a user device comprises:
presenting, in the user interface, at an end of the order, one or more replacement items each corresponding to an item for the order with a price saving amount associated with the respective replacement item.

10. The method of claim 1, further comprising:
identifying a second set of candidate replacement items for a second item of the one or more items, wherein the second set of candidate replacement items comprise one or more larger size variants for the second item;
determining a frequency of rejection on a larger size variant replacement recommendation for the user; and
responsive to the frequency of rejection being larger than a threshold value, determining not to recommend to the user to replace a larger size variant for the second item for the order.

11. The method of claim 1, wherein identifying the set of candidate replacement items for the first item comprises:
generating a list of candidate items for the first item based on a hierarchical taxonomy and historical replacement data;
applying a machine learned replacement model to each of the list of candidate items, wherein the machine learned replacement model outputs a score that is indicative of whether a user would accept the item as a replacement for the first item;
ranking the list of candidate items based on the score of each candidate item; and
selecting the set of candidate replacement items for the first item based on the rank and sizes of the candidate items.

12. The method of claim 1, wherein identifying the set of candidate replacement items for the first item comprises:
accessing a hierarchical taxonomy in the computer system, the hierarchical taxonomy comprising items labeled as larger size variants;
inputting the first item to a replacement model, wherein the replacement model is trained to output, for each of the larger size variants from the hierarchical taxonomy, a likelihood that a user would select the labeled larger size variant as a replacement for an input item; and
selecting a labeled larger size variant based on the likelihood as the candidate replacement item for the first item.

13. A non-transitory computer-readable storage medium storing instructions, the instructions when executable by a processor to:
receive one or more items for an order from a user;
identify a set of candidate replacement items for a first item of the one or more items, wherein the candidate replacement items comprise one or more larger size variants for the first item;
estimate a benefit value for each of the candidate larger size variants when replacing the respective larger size variant for the first item;
apply a machine learned acceptance model to each candidate larger size variant to predict a likelihood that the user would accept a suggestion to replace the respective candidate larger size variant for the first item, wherein the machine learned acceptance model is trained by:
accessing a training dataset comprising a plurality of training examples, each training example including a target item, a larger size variant for the target item, and a label indicating whether the larger size variant was previously purchased or not as a replacement for the target item,
applying the acceptance model to each training example to determine a difference between the label and the predicted likelihood of the user accepts to replace the target item with the larger size variant in the respective training example,
updating the training dataset by updating the label of the respective training example based on the determined difference and by supplementing the training examples with user feature information and product feature information, and
updating the acceptance model for each training example using the updated training dataset;
determine one of the candidate larger size variants as a replacement item for the first item based on the predicted likelihood and the estimated benefit value; and
send the replacement item for display in a user interface on a user device.

14. The non-transitory computer-readable storage medium of claim 13, wherein
the user feature information comprises one or more of: typical size of a product in previous orders, average ordering frequency, gross merchandise value, retailers shopped in previous orders, previous response to replacement suggestions, user location, shopping time, items for current order; and the product feature information comprises one or more of: size, price per unit, amount of price saving, availability, popularity, item category, and discount activity of the candidate larger size variant.

15. The non-transitory computer-readable storage medium of claim 14, further comprising instructions that when executed cause the processor to: train, using the user feature information and the product feature information of an item, the machine learned acceptance model to predict a likelihood that the user would accept a suggestion to replace a candidate larger size variant for the item.

16. The non-transitory computer-readable storage medium of claim 15, further comprising instructions that when executed cause the processor to:
receive feedback information indicating whether the user replaces the replacement item for the first item; and
update the machine learned acceptance model using the feedback information.

17. The non-transitory computer-readable storage medium of claim 13, wherein the benefit value for each of the candidate larger size variant is estimated based on one or more of: value of cost saving, value of loss revenue, value of increased sale, value of time saving, value of customer experience, and sponsorship value.

18. The non-transitory computer-readable storage medium of claim 13, wherein the instruction to determine one of the candidate larger size variants as a replacement item for the first item based on the predicted likelihood and the estimated benefit value comprises:
calculating a recommendation value by multiplying the predicted likelihood of a candidate larger size variant by the benefit value of the candidate larger size variant; and
responsive to the recommendation value being larger than a threshold value, determining the candidate larger size variant as the replacement item for the first item.

19. The non-transitory computer-readable storage medium of claim 13, further comprising instructions that when executed cause the processor to:
identify a second set of candidate replacement items for a second item of the one or more items, wherein the second set of candidate replacement items comprise one or more larger size variants for the second item;
determine a frequency of rejection on a larger size variant replacement recommendation for the user; and
responsive to the frequency of rejection being larger than a threshold value, determine not to recommend to the user to replace a larger size variant for the second item for the order.

20. A computer system comprising:
a computer processor; and
a non-transitory computer-readable storage medium having instructions that when executed by the computer processor perform actions comprising:
receiving one or more items for an order from a user;
identifying a set of candidate replacement items for a first item of the one or more items, wherein the candidate replacement items comprise one or more larger size variants for the first item;
estimating a benefit value for each of the candidate larger size variants when replacing the respective larger size variant for the first item;
applying a machine learned acceptance model to each candidate larger size variant to predict a likelihood that the user would accept a suggestion to replace the respective candidate larger size variant for the first item, wherein the machine learned acceptance model is trained by:
accessing a training dataset comprising a plurality of training examples, each training example including a target item, a larger size variant for the target item, and a label indicating whether the larger size variant was previously purchased or not as a replacement for the target item,
applying the acceptance model to each training example to determine a difference between the label and the predicted likelihood of the user accepts to replace the target item with the larger size variant in the respective training example,
updating the training dataset by updating the label of the respective training example based on the determined difference and by supplementing the training examples with user feature information and product feature information, and
updating the acceptance model for each training example using the updated training dataset;
determining one of the candidate larger size variants as a replacement item for the first item based on the predicted likelihood and the estimated benefit value; and
sending the replacement item for display in a user interface on a user device.

* * * * *